United States Patent
Silva (10) Patent No.: US 12,528,283 B2
(45) Date of Patent: Jan. 20, 2026

(54) SYSTEMS AND METHODS FOR JOINING COMPOSITE STRUCTURES TO METAL STRUCTURES

(71) Applicant: FMC Technologies, Inc., Houston, TX (US)

(72) Inventor: Gabriel Silva, Houston, TX (US)

(73) Assignee: FMC Technologies, Inc., Houston, TX (US)

(*) Notice: Subject to any disclaimer, the term of this patent is extended or adjusted under 35 U.S.C. 154(b) by 39 days.

(21) Appl. No.: 18/360,203

(22) Filed: Jul. 27, 2023

(65) Prior Publication Data
US 2025/0033345 A1    Jan. 30, 2025

(51) Int. Cl.
| | |
|---|---|
| *B32B 38/00* | (2006.01) |
| *B32B 37/06* | (2006.01) |
| *F17C 1/00* | (2006.01) |
| *B32B 37/00* | (2006.01) |

(52) U.S. Cl.
CPC .......... *B32B 38/0008* (2013.01); *B32B 37/06* (2013.01); *F17C 1/00* (2013.01); *B32B 2037/0092* (2013.01); *B32B 2311/22* (2013.01); *B32B 2311/24* (2013.01)

(58) Field of Classification Search
CPC ....... B32B 38/0008; B32B 37/06; F17C 1/00; B29C 65/76
See application file for complete search history.

(56) References Cited

U.S. PATENT DOCUMENTS

| | | | | |
|---|---|---|---|---|
| 6,773,535 | B1* | 8/2004 | Wetzel | B29C 66/1122 156/247 |
| 2005/0236378 | A1* | 10/2005 | Boyle | B23K 26/126 257/E21.599 |
| 2007/0023129 | A1* | 2/2007 | Stieler | B29C 66/72321 156/158 |
| 2016/0167353 | A1 | 6/2016 | Fan et al. | |
| 2017/0175950 | A1* | 6/2017 | Chung | F17C 1/00 |
| 2022/0305597 | A1* | 9/2022 | Thompson | B29C 66/72 |
| 2022/0410523 | A1* | 12/2022 | Sai | B29C 66/91933 |

FOREIGN PATENT DOCUMENTS

EP     3974095 A1    3/2022

OTHER PUBLICATIONS

PCT Patent Application PCT/US24/30370 International Search Report and Written Opinion of the International Searching Authority issued Oct. 7, 2024.

(Continued)

*Primary Examiner* — Daniel McNally
(74) *Attorney, Agent, or Firm* — Erise IP, P.A.

(57) ABSTRACT

Systems, methods, and devices for providing a joining technique for a metal part and a composite part. The joining technique in which either the metal or the composite part has at least one portion receive a laser etching treatment according at least in part to a laser configuration. Further, the joining technique in which the metal and composite parts are positioned to contact at least one etched surface. Even further, the joining technique in which a joining process is used to join the metal part and composite part to produce a unitary structure.

20 Claims, 8 Drawing Sheets

(56) References Cited

OTHER PUBLICATIONS

Borrie, D., et al., Bonded CFRP/Steel Systems, Remedies of Bond Degradation and Behaviour of CFRP Repaired Steel: An Overview. Polymers, MDPI, 2021, 13, 1533. https://doi.org/10.3390/polym13091533.

Gebauer, J., et al. Laser structured surfaces for metal-plastic hybrid joined by injection molding, Dresden, Germany, Published: Aug. 2018.

Thoss, Andreas, et al., Joining composites and metal: A laser process, Industrial Laser Solutions, May 20, 2020, https://www.laserfocusworld.com/industrial-laser-solutions/article/14221695/joining-composites-and-metal-a-laser-process.

* cited by examiner

SYSTEMS AND METHODS FOR JOINING COMPOSITE STRUCTURES TO METAL STRUCTURES

BACKGROUND

1. Field

Embodiments of the present disclosure relate to joining techniques. More specifically, embodiments of the present disclosure relate to techniques for joining composite structures to metal structures.

2. Related Art

Joining techniques such as fasteners, adhesives, and induction welding have been used to join composite structures to metal structures. However, the typical joining techniques are prone to complications. For example, joining techniques using fasteners require drilling holes, which may be a critical area for structural failure for composite materials. Further, for example, joining techniques using adhesives have limitations for certain environmental applications and shear stress loading. Even further, joining techniques using adhesives may result in the adhesive melting away due to high-temperature use or heat from subsequent manufacturing processes causing the joined structures to become disjoined.

SUMMARY

Embodiments of the present disclosure solve the above-mentioned problems by providing a joining technique that avoids material damage associated with joining techniques using fasteners and has an increased shear stress capability of the joint compared to joining techniques using adhesives. Embodiments of the present disclosure contemplate a joining technique that involves applying a laser etching to at least one surface of a first structure based on a selected laser configuration. The laser etched surface of the first structure provides increased adhesion to at least one surface of a second structure as compared to traditional joining techniques such as fasteners and adhesives. Further, the joining technique provided may have a higher failure temperature for the joint compared to joints using adhesives.

In some aspects, the techniques described herein relate to a method of joining a metal part and a composite part to form a unitary structure, the method including: selecting a laser configuration for a laser etching treatment to be applied to at least one surface of the metal part, wherein the metal part includes a metal material and the composite part includes a composite material, wherein the laser configuration is selected based at least in part on a material property of the metal material; etching the at least one surface of the metal part using the laser etching treatment according to the laser configuration; positioning the metal part such that the at least one surface of the metal part contacts the composite part; providing heat, using at least one heating element, to the at least one surface of the metal part; and simultaneously while providing heat, compressing the at least one surface of the metal part and the composite part together to form the unitary structure.

In some aspects, the techniques described herein relate to a method, wherein the laser configuration includes a parallel line pattern.

In some aspects, the techniques described herein relate to a method, wherein the metal material includes steel.

In some aspects, the techniques described herein relate to a method, wherein the metal material includes aluminum.

In some aspects, the techniques described herein relate to a method, wherein the metal material includes Inconel®.

In some aspects, the techniques described herein relate to a method, wherein the composite material includes carbon fiber.

In some aspects, the techniques described herein relate to a method, wherein the compressing is performed by a press configured to receive the metal part and the composite part.

In some aspects, the techniques described herein relate to a method, wherein the heat is provided by generating eddy currents using the at least one heating element, and wherein the at least one heating element is coupled to the press.

In some aspects, the techniques described herein relate to a method, wherein an adhesive is not applied to the at least one surface of the metal part prior to compressing the at least one surface of the metal part and the composite part together.

In some aspects, the techniques described herein relate to a method of joining a metal part and a composite part to form a unitary structure, the method including: selecting a laser configuration for a laser etching treatment to be applied to at least one surface of the metal part, wherein the metal part includes a steel material and the composite part includes a carbon fiber material, wherein the laser configuration is selected based at least in part on a material property of the steel material; etching the at least one surface of the metal part using the laser etching treatment according to the laser configuration; positioning the metal part such that the at least one surface of the metal part contacts the composite part; providing heat, using at least one heating element, to the at least one surface of the metal part; and simultaneously while providing heat, compressing the at least one surface of the metal part and the composite part together to form the unitary structure.

In some aspects, the techniques described herein relate to a method, wherein at least one additional metal part is joined to the composite part, the method further including: etching at least one surface on the additional metal part.

In some aspects, the techniques described herein relate to a method, wherein at least one additional composite part is joined to an additional etched surface of the metal part.

In some aspects, the techniques described herein relate to a method, wherein the method further including: selecting a subsequent laser configuration for the laser etching treatment to be applied to at least a portion of the at least one surface of the metal part, wherein the subsequent laser configuration is selected based at least in part on a loading of the unitary structure.

In some aspects, the techniques described herein relate to a method, wherein the simultaneous heating and compressing is completed in less than five minutes.

In some aspects, the techniques described herein relate to a pressure containment structure including: a metal part including: a metal material; and at least one surface including an etching pattern formed by a laser etching treatment; and a composite part including a composite material, wherein the composite part is joined to the at least one surface of the metal part by providing heat to the at least one surface of the metal part and, simultaneously while providing heat, compressing the at least one surface of the metal part and the composite part together.

In some aspects, the techniques described herein relate to a pressure containment structure, wherein the pressure containment structure includes a pressure containing tank.

In some aspects, the techniques described herein relate to a pressure containment structure, wherein the pressure containment structure includes a valve body.

In some aspects, the techniques described herein relate to a pressure containment structure, wherein the pressure containment structure includes a tube joint.

In some aspects, the techniques described herein relate to a pressure containment structure, wherein the metal material includes Inconel® and the composite material includes carbon fiber polyether ether ketone.

In some aspects, the techniques described herein relate to a pressure containment structure, wherein the pressure containment structure is configured to be disposed underwater in a subsea assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Joining together metal structures and composite structures is sought after due to the possibility of creating lighter and stronger structures compared to steel structures. Currently known techniques to join together metal structures and composite structures may have complications due to the formed joint. For example, drilling holes in composite structures for a bolted joint must be carefully done to avoid structural fiber damage. Further, for example, joints created by adhesives may have limitations for shear stress loading, certain environmental applications, and are prone to melting during high-temperature use. Embodiments of the present disclosure provide a joining technique that allows for the creation of lighter and stronger structures that are faster and safer to produce than steel structures.

Embodiments of the present disclosure reduce the material damage when compared to bolted joints of metal and composite parts. Specifically, in some embodiments, a laser etching treatment is applied according to a laser configuration to at least one surface of the metal structure. The depth of the laser etching may not substantially interfere with the structural integrity of the material. Further, embodiments of the present disclosure increase the shear stress capability of the joint compared to joints created by adhesives by at least partially melting the composite material into the etched texture of the metal structure. Embodiments of the present disclosure further contemplate positioning the structures into a certain configuration and using a joining process configured to simultaneously provide heat and compression to facilitate the melting of the composite material into the etched surface of the metal structure to join the structures in the certain configuration. For example, a press and an induction coil are used to provide the compression and heat respectively.

Figure 1:
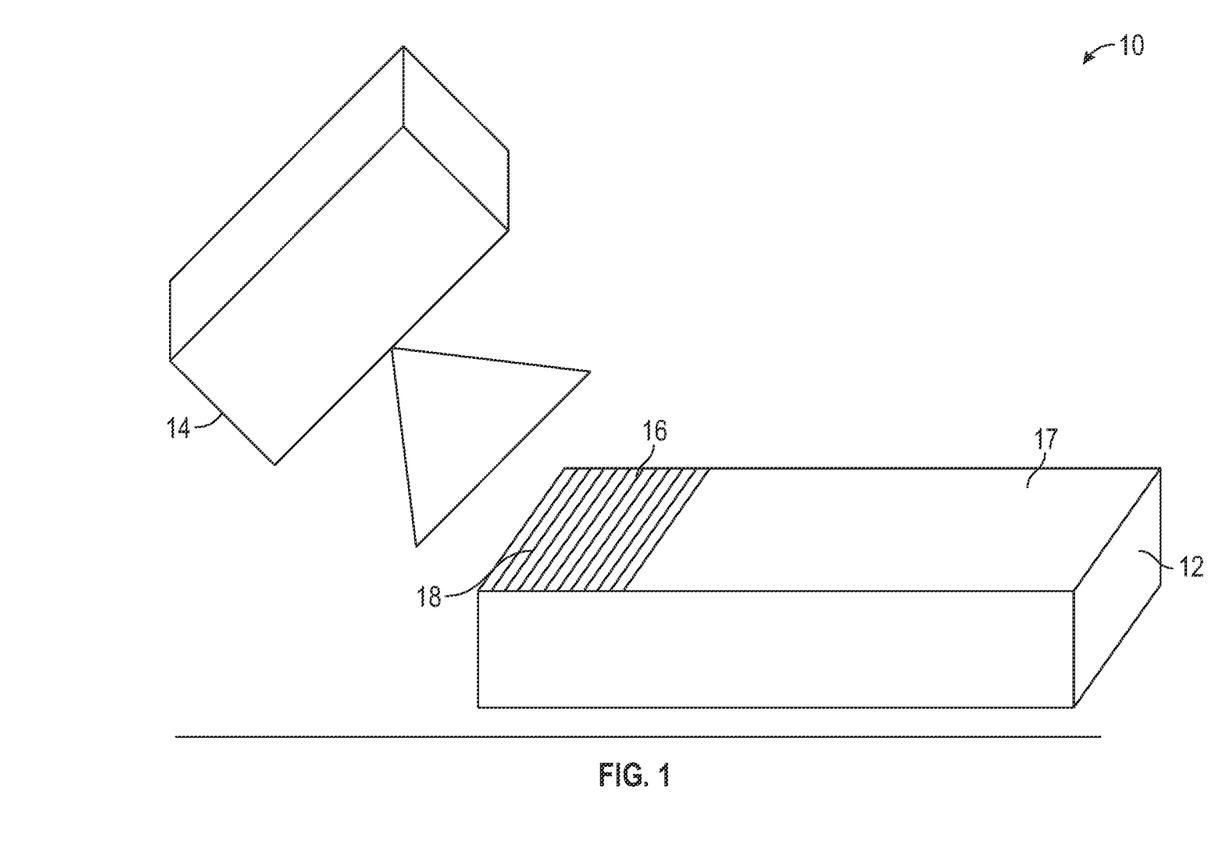
FIG. 1 illustrates an exemplary laser etching treatment relating to some embodiments of the present disclosure.

FIG. 1 illustrates an exemplary laser etching treatment 10 relating to some embodiments of the present disclosure. The laser etching treatment 10 is applied to a metal part 12. In some embodiments, the metal part 12 can be a tube, an L-bracket, a valve casing, or any other part made of metal material. In some embodiments, the metal part 12 comprises a metal material such as, for example, a steel material. Additionally, or alternatively, the metal material may include any combination of an elemental metal, metal alloy, steel, brass, Inconel®, aluminum, copper, iron, lead, indium, beryllium, nickel, titanium, molybdenum, chromium, and tin, as well as other suitable metal materials and constituents thereof. The metal material may be selected based at least in part on a material property of the metal material. For example, a corrosion resistant metal material, such as stainless steel, may be selected to resist corrosion when exposed to corrosive environments. The metal material may be selected based at least in part due to the melting temperature of the metal material.

The laser etching treatment 10 is performed by a laser etching device 14. In some embodiments, the laser etching device is any of a CO2 laser, a fiber laser, a UV laser, or another suitable laser ablation device. The laser etching treatment 10 is applied according to a laser configuration for a laser etching 16 that is selected for at least one surface 17 of the metal part 12. The laser configuration may be selected based at least in part on a material property of the metal material of the metal part 12. For example, for a stainless steel material, the laser configuration may be selected to have the laser etching comprise a parallel line pattern and an etching depth and width between 100 and 500 micrometers. Another example includes selecting the laser configuration for aluminum to have the separate grooves spaced 500 micrometers apart such that the structural integrity of the soft metal is not affected. In some embodiments, the laser etching 16 comprises any combination of a pattern of parallel lines, a pattern of orthogonal lines, a pattern of wavy lines, or any other pattern of laser ablation, a chosen depth of etching, and a chosen width of etching according to a selected laser configuration. Materials that are less susceptible to corrosion may be preferred for this process so that the joint may not be affected if exposed to corrosive environments. For example, stainless steel and carbon fiber reinforced polymer may be selected due to their corrosion resistance.

Some embodiments are contemplated in which the laser configuration is selected based at least in part on a ratio of any combination of a thickness of the metal part and/or the composite part, a length of either of the metal part and/or the composite part, a width of the metal part and/or the composite part, a surface area of the metal part and/or the composite part, a volume of the metal part and/or the composite part, a surface area of the planned joint, or any other dimension of either part. In some embodiments, the depth of etching, the width of etching, or both the depth of etching and the width of etching may be selected based at least in part on the thickness of the metal part, the composite part, or both the metal part and the composite part. For example, for a metal part with a thickness of one inch, the depth of etching may be selected to be less than one third of an inch to avoid possible material damage. Additionally, or alternatively, in some embodiments, the depth of etching, the width of etching, or both the depth of etching and the width of etching may be selected based at least in part on the microstructure of the composite material. For example, the etching width may be selected to be larger than an average fiber length of a plurality of fibers included in the composite material such that the fibers are able to fit within the etchings. In some embodiments, the depth of etching may be from about 50 to about 250 micrometers. Further, in some embodiments, the depth of etching may be from about 200 to about 500 micrometers. In some embodiments, the width of etching may be from about 50 to about 250 micrometers. Further, in some embodiments, the width of etching may be from about 200 to about 500 micrometers.

In some embodiments, the laser etching 16 includes a plurality of separate distinct etching patterns. For example, a first pattern of etching may be included at a first portion of the metal part 12 or at a first surface while a second pattern of etching is included at another portion (or surface) of the metal part 12 to increase adhesion at certain points. Any of the depth of etching, the width of etching, or both the depth of etching and the width of etching may be altered at certain portions of the metal part 12 to increase adhesion at those respective portions. For example, the laser etching 16 may comprise a parallel line pattern where the depth of the etching is formed deeper as the etching becomes closer to a load bearing point to facilitate a stronger bond at the load bearing point. In some embodiments, the orientation of the laser etching may be selected based on an application of the structure. Embodiments are also contemplated in which the orientation of the etching pattern may be based at least in part on a loading of the structure. For example, the etching of a structure can have grooves oriented perpendicular to the expected loading. Further, in some embodiments, the etching may have grooves oriented to stop permeability in pressure containing structures. For example, the structure may comprise an outer surface with grooves of the etching oriented circumferentially around an outer portion of the structure to thereby prevent permeation of a fluid through the structure and/or to increase a pressure rating of the structure. After receiving the laser etching treatment 10, the metal part 12 may have at least one etched surface 18.

In some embodiments, the laser etching 16 comprises a plurality of etched grooves applied to the at least one etched surface 18 of the metal part 12. The laser etching 16 may be applied according to the selected laser configuration. The plurality of etched grooves may be configured to receive an at least partially melted portion of another part during a subsequent joining process. For example, a polymer material may be melted to wet and fill in the plurality of etched grooves of the laser etching 16. In some embodiments, a subsequent joining process may be configured to provide heat and compression to facilitate the at least partially melted portion of another part into the plurality of etched grooves to provide a structural bonding between the metal part and the other part.

Figure 2:
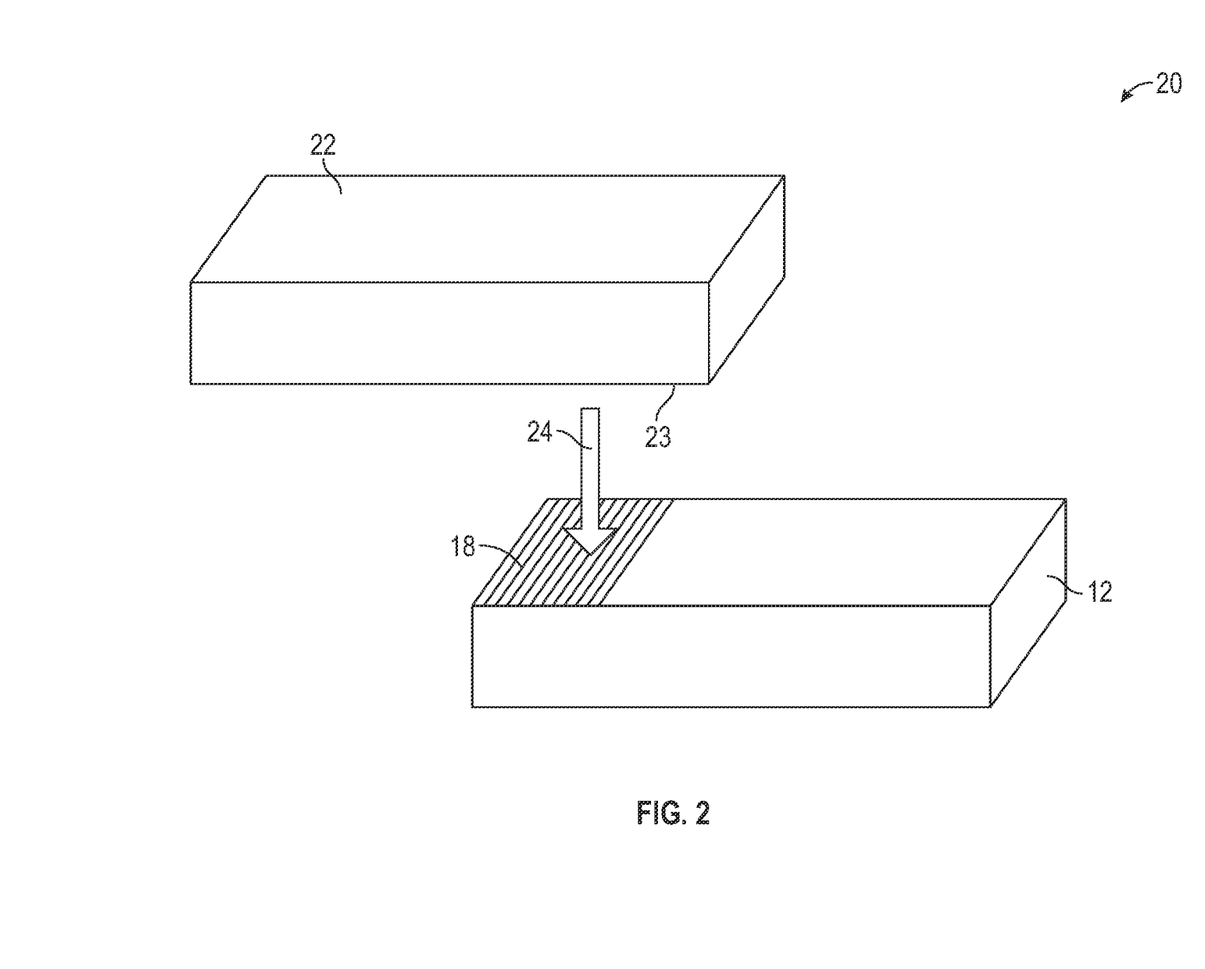
FIG. 2 illustrates an exemplary positioning process of a composite part and a metal part relating to some embodiments of the present disclosure.

FIG. 2 illustrates an exemplary positioning process 20 of a composite part 22 and the metal part 12 relating to some embodiments of the present disclosure. The composite part 22 is positioned directly above the metal part 12, as shown. The composite part 22 may then be moved downward along the direction 24 shown towards the metal part 12 such that at least one surface 23 of the composite part 22 contacts at least one etched surface 18 of the metal part 12. For example, a bottom surface of the composite part 22 may be joined to the at least one etched surface 18 of the metal part 12. The positioning of the composite part 22 and the metal part 12 is done such that the composite part 22 contacts the at least one etched surface 18 of the metal part 12. After the metal part 12 and the composite part 22 are positioned, the metal part and the composite part may be joined together using a similar joining process described later in FIG. 3. In some embodiments, the composite part 22 may be positioned to contact the at least one etched surface 18 of multiple metal parts. In some embodiments, multiple composite parts may be positioned to contact the at least one etched surface 18 of the metal part 12. Further still, in some embodiments, a plurality of metal parts is joined to a respective plurality of composite parts. For example, a unitary pipeline structure may be formed by joining together multiple valves, pipes, pressure vessels, hollow structures, and support structures, each made of either metal material or composite material.

In some embodiments, the composite part 22 comprises a composite material such as, for example, a carbon fiber material. In some embodiments, the composite part 22 comprises a carbon fiber (CF) polyether ether ketone (PEEK) material. In some embodiments, the composite part 22 comprises a polymer material. In some embodiments, the composite part 22 comprises a polyphenylene sulfide (PPS) material. Additionally, or alternatively, embodiments are contemplated in which the composite material comprises any combination of fibers, polymers, resins, plastic, carbon fiber, fiberglass, polyvinyl chloride, PEEK, and PPS, as well as other suitable composite materials and constituents thereof. The composite material may be selected based at least in part on a material property of the composite material. For example, a corrosion resistant composite material, such as a carbon fiber reinforced polymer material, may be selected to resist corrosion when exposed to corrosive environments. The composite material may be selected based at least in part due to the melting temperature of the composite material. For example, a composite comprising a thermoplastic polymer material may be selected such that the thermoplastic polymer material melts at a lower temperature than a melting point of the metal material.

Figure 3:
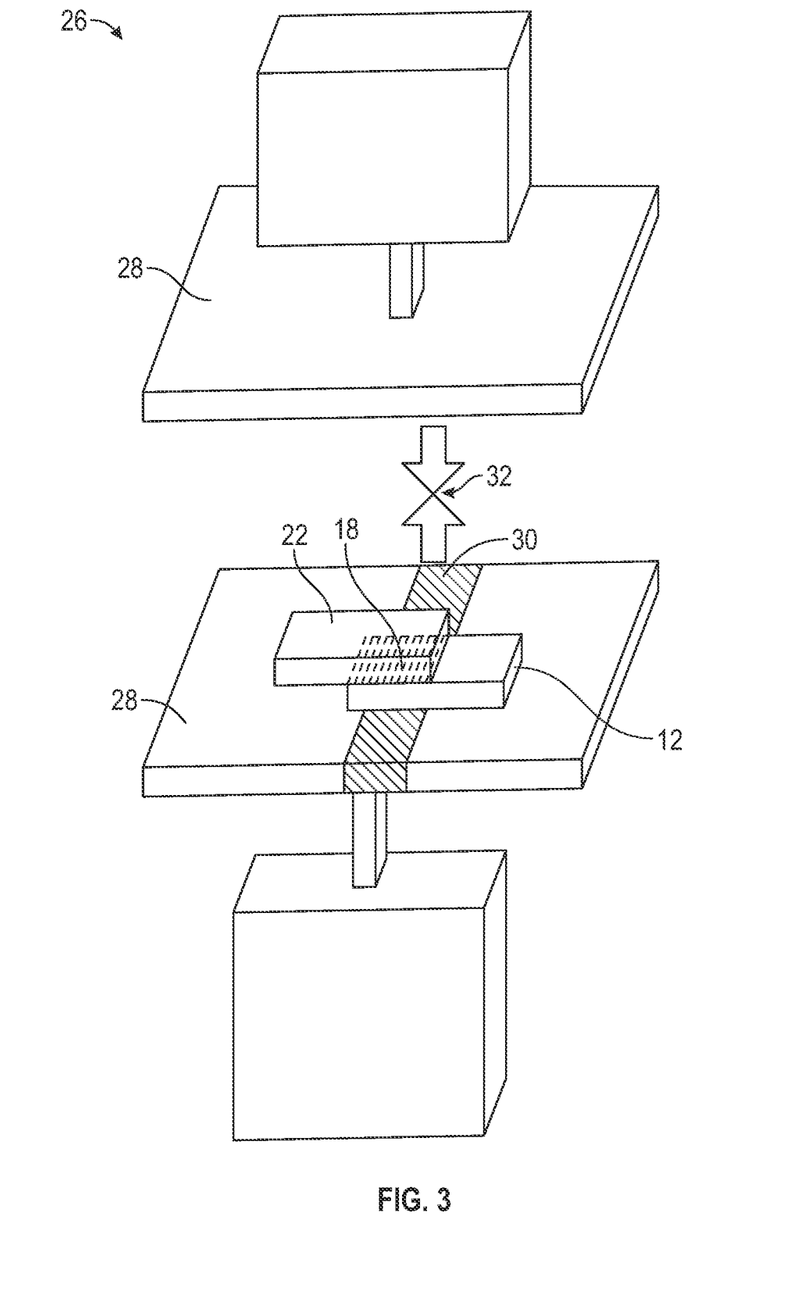
FIG. 3 depicts an exemplary joining process configured to simultaneously provide heat and compression to join a composite part and a metal part relating to some embodiments of the present disclosure.

FIG. 3 depicts an exemplary joining process 26 configured to simultaneously provide heat and compression to join the composite part 22 and the metal part 12 relating to some embodiments of the present disclosure. At least one heating element 30 provides the heat to the metal part 12 while a press 28 provides compression in a direction of compression 32 to both the metal part 12 and the composite part 22. The simultaneous heating and compressing of the joining process 26 causes the composite part 22 to melt at least partially and fill in the etchings of the at least one etched surface 18 of the metal part 12. Here, the heating causes at least a portion of the composite part to melt while the simultaneous compression facilitates the flow of the melted portion of the composite part 22 into the grooves of the at least one etched surface 18 of the metal part 12. Alternatively, embodiments are contemplated in which the heating and compression are provided separately. For example, at least one of the structures may be heated prior to compression. In some embodiments, the composite part 22 is positioned above the metal part 12 such that, during the joining process, gravity helps the at least partially melted surface of the composite part 22 fill in the etched grooves of the at least one etched surface 18 of the metal part 12. In some embodiments, the compression is performed by a press 28. Additionally, or alternatively, the joining process 26 may include any combination of a press, clamp, vice, or another suitable compression device. In some embodiments, the at least one heating element comprises an induction coil. Additionally, or alternatively, the joining process 26 may include any combination of an induction coil, laser heating, resistance heating, or another suitable heating device. Further, in some embodiments, the induction coil may utilize a flux concentrator. In some embodiments, the joining process 26 is completed in less than five minutes. Further, in some embodiments, the joining process 26 is completed in less than two minutes.

Alternatively, or additionally, in some embodiments, the laser etching treatment 10 is applied to at least one surface 23 of the composite part 22. The laser etching treatment 10 is performed by the laser etching device 14. The laser etching treatment 10 is applied according to a laser configuration that is selected for the at least one surface 23 of the composite part 22. The laser configuration may be selected based at least in part on a material property of the composite part 22. For example, for a carbon fiber reinforced composite material, the laser configuration may be selected to have the depth of etching be shallow enough and the width of etching be thin enough to not interfere with the fiber distribution of the composite material. Further, for example, for a carbon fiber reinforced composite material, the laser configuration may be selected to have a pattern similar to the carbon fiber's orientation in the composite material such that the etching does not interfere with the fiber distribution of the composite material. The parts are positioned using the positioning process 20 previously described above and shown in FIG. 2. The joining process 26 may be used to join the at least one etched surface 23 of the composite part 22 to the at least one surface 17 of the metal part 12. In some such embodiments, the provided heat causes a portion of the metal part 12 to melt at least along a boundary layer between the metal part 12 and the composite part 22 and wet the at least one etched surface 23 of the composite part 22.

In some embodiments, a heating configuration may be selected to control the heating provided by the at least one heating element. The heating configuration may be selected based at least in part on the melting temperature of the composite part, the metal part, or both the composite part and the metal part. For example, the heating configuration may be selected to at least reach the lower melting temperature of the composite part 22 but not exceed the higher melting temperature of the metal part 12. Alternatively, for example, the heating configuration may be selected to at least reach the lower melting temperature of the metal part 12 but not exceed the higher melting temperature of the composite part 22.

This method of joining solves problems found with other types of joining known in the art. Fasteners used for joining metal to composites may require drilling holes, which can damage the integrity of a structure. Adhesives used for joining metal to composites have limitations for certain environmental applications and shear stress loading. The disclosed method of joining metal and composites increases the shear stress capability of the joint compared to adhesive joining and avoids the material damage associated with fastener joining. In some embodiments, the depth of the laser etching may be up to one millimeter deep. Additionally, or alternatively, in some embodiments, the thickness of the material should be no less than three times thicker than the etching depth. An etching of this depth does not substantially interfere with the structural integrity of the material.

In some embodiments, the joining process 26 may be performed at a work site. In some embodiments, it is contemplated that a heating device and a compressing device may be utilized to perform the joining process 26 at a work site to quickly join parts. For example, pre-treated scaffolding parts may be delivered to the work site and joined on-site using the joining process 26 to create a scaffolding structure. This eliminates the need for joining parts prior to being sent to a work site.

Figure 4:
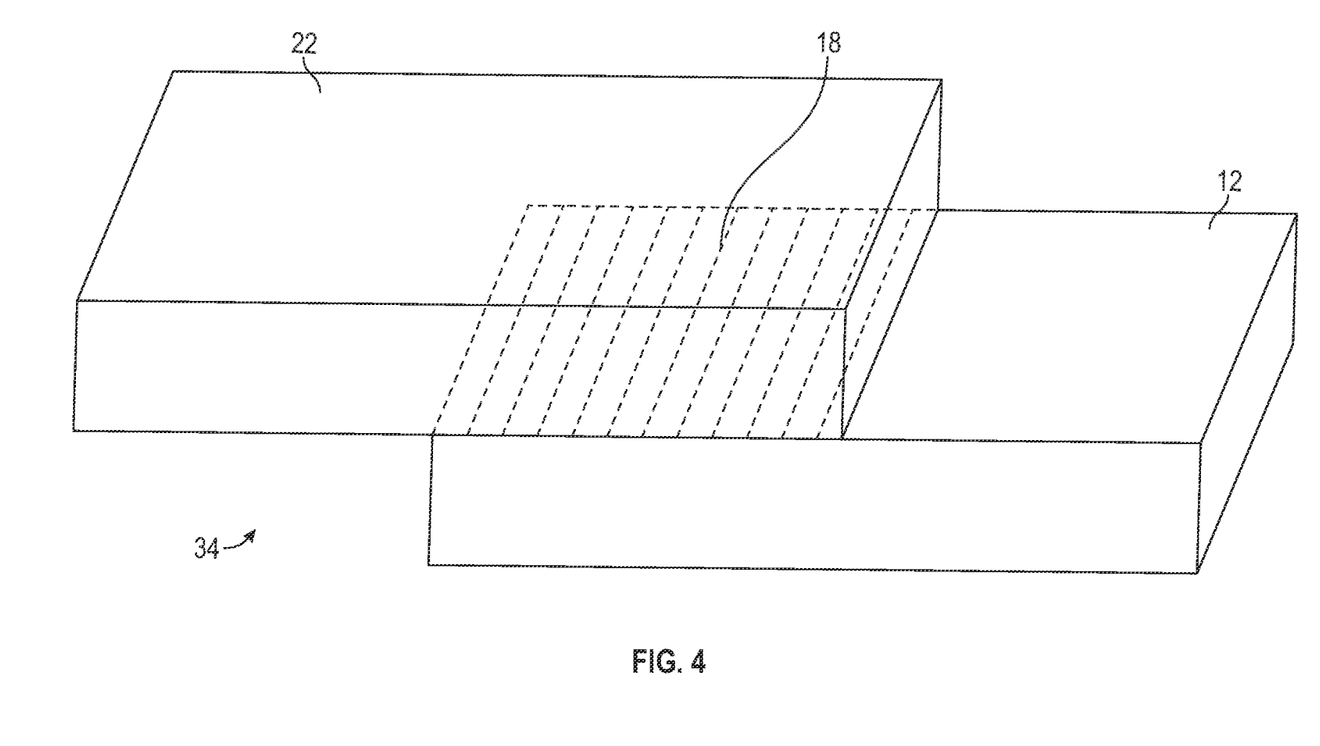
FIG. 4 illustrates an exemplary unitary structure comprising the metal part and the composite part relating to some embodiments of the present disclosure.

FIG. 4 illustrates an exemplary unitary structure 34 comprising the metal part 12 and the composite part 22 relating to some embodiments of the present disclosure. The unitary structure 34 comprises the composite part 22 joined to the metal part 12 on the at least one etched surface 18 of the metal part 12.

In some embodiments, the unitary structure 34 may be formed by attaching multiple composite parts to the at least one etched surface 18 of the metal part 12. In some embodiments, the composite part 22 may be attached to multiple metal parts, all having received the laser etching treatment 10 to at least one surface of each metal part. Joining together multiple composite parts to the metal part 12 or multiple metal parts to the composite part 22 allows for more possibilities while creating the unitary structure 34. For example, scaffolding structures of varying heights and lengths may be created utilizing multiple parts of varying materials. Further, for example, a unitary pipeline structure may be formed by joining together multiple valves, pipes, pressure vessels, hollow structures, and support structures, each made of varying materials. In some embodiments, a unitary pipeline structure may be used for oil exploration, production, or transportation.

The unitary structure 34 may be disjoined by providing heat, using at least one heating element, and by providing tension. This disjoining process effectively reverses the joining process 26. In some embodiments, the tension and heat are provided simultaneously to disjoin the metal part 12 and the composite part 22 of the unitary structure 34. Alternatively, in some embodiments, the heat may be provided first and followed by providing tension. Further, the heat required to disjoin the unitary structure 34 may be larger than the heat provided during the joining process 26. Some embodiments are contemplated in which the devices used to provide the heat and compression to form the unitary structure 34 may be configured to also provide the heat and tension used to disjoin the unitary structure 34. Alternatively, in some embodiments, separate heating devices may be used for each respective process stage. After disjoining the unitary structure 34, the metal part 12 and the composite part 22 may be reused in other structures. For example, a disjoined metal part may be reused and rejoined to form a different unitary structure with a different composite part. This feature allows for ease of disassembling structures joined using the joining process 26 while minimizing waste, increasing recycling, and reducing carbon dioxide emissions. Some embodiments are contemplated where the disjoining process may be done at a work site to disjoin structures formed using the joining process 26. For example, to dismantle a scaffolding structure created using the joining process 26, a device for providing tension and a device for providing heat are utilized to disjoin the individual parts such that the individual parts may be reused in the creation of other structures.

Figure 5A:
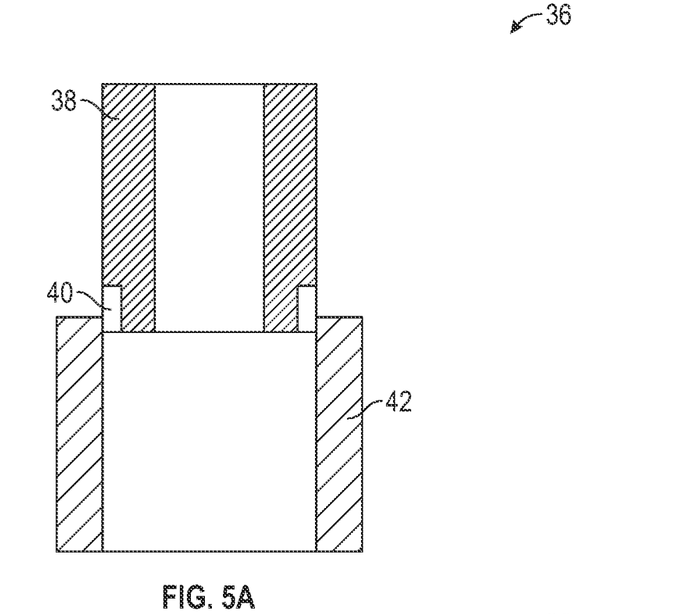
FIG. 5A depicts a cross-section of an exemplary unitary structure comprising a tubular metal part and a tubular composite part relating to some embodiments.

FIG. 5A depicts a cross-section of an exemplary unitary structure 36 comprising a tubular metal part 38 and a tubular composite part 42 relating to some embodiments. The cross-section is utilized to show the tubular metal part 38 having at least one etched surface 40 that has previously received the laser etching treatment 10. The laser etching treatment 10 is performed by a laser etching device 14. In some embodiments, the laser etching device is any of a CO2 laser, a fiber laser, a UV laser, or another suitable laser ablation device. The unitary structure 36 comprises the tubular composite part 42 joined to the tubular metal part 38 on the at least one etched surface 40 of the tubular metal part 38. In some embodiments, the laser etching treatment 10 is applied to an outer surface of the tubular metal part 38 at one end that contacts an internal surface of the tubular composite part 42. Alternatively, in some embodiments, the laser etching treatment 10 is applied to an internal surface of the tubular metal part 38 at one end that contacts an external surface of the tubular composite part 42. It is further contemplated that an interference fit may be used to encourage stronger adhesion. Additionally, or alternatively, in some embodiments, the edge of the tubular metal part 38 may receive the laser etching treatment 10 and be joined to the edge of the tubular composite part 42 to form the unitary structure 36.

Figure 5B:
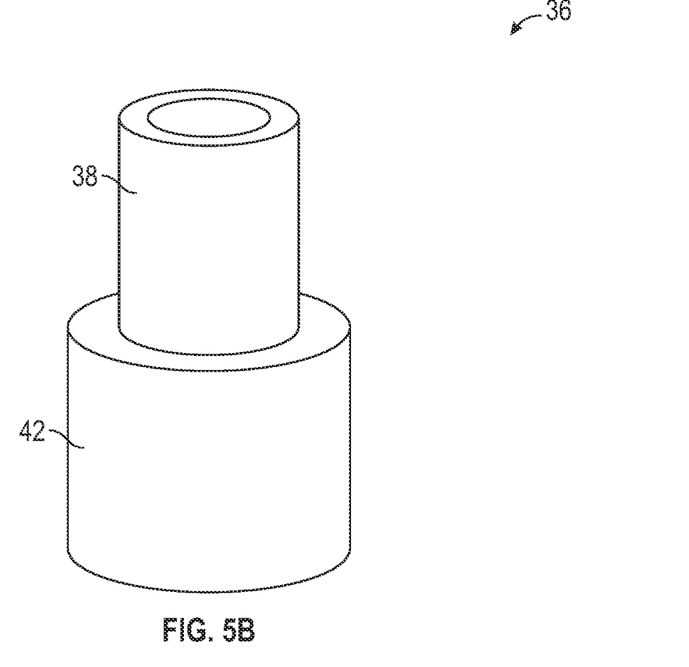
FIG. 5B depicts an exemplary unitary structure comprising a tubular metal part and a tubular composite part relating to some embodiments.

FIG. 5B depicts the exemplary unitary structure 36 comprising the tubular metal part 38 and the tubular composite part 42 relating to some embodiments. The unitary structure 36 comprises the tubular composite part 42 joined to the tubular metal part 38 on the at least one etched surface 40 of the tubular metal part 38. In some embodiments, the unitary structure 36 may be formed by attaching multiple tubular composite parts to the at least one etched surface 40 of the tubular metal part 38. In some embodiments, the tubular composite part 42 may be attached to multiple tubular metal parts, all having received the laser etching treatment 10 to at least one surface of each tubular metal part. Joining together multiple tubular composite parts to the tubular metal part 38 or multiple tubular metal parts to the tubular composite part 42 allows for more possibilities while creating the unitary structure 36. For example, pipeline structures of varying junctions, heights, and lengths may be created utilizing multiple tubular parts of varying materials. Additionally, in some embodiments, similar joining techniques are contemplated for joining one or more tubular parts such as pipes to one or more pipe fittings. For example, embodiments are contemplated in which an etching is applied to an end of a composite pipe for joining the end of the pipe to a metal flange.

Figure 6:
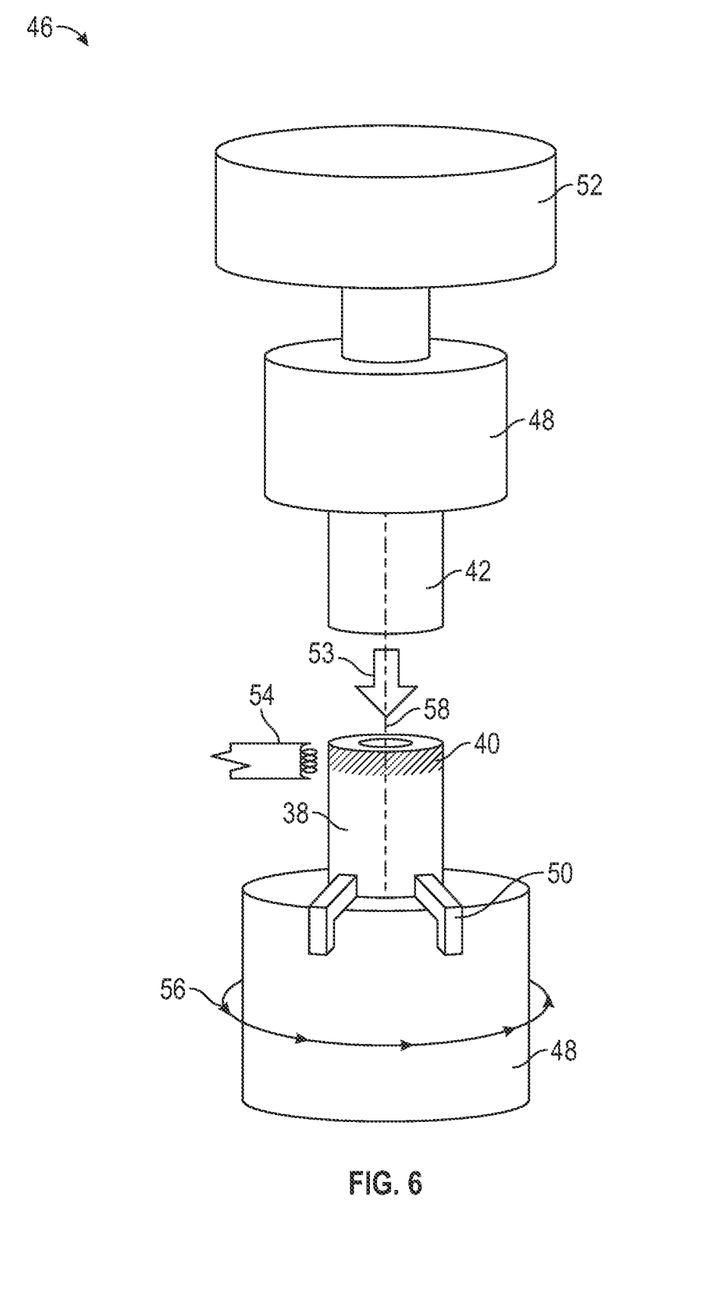
FIG. 6 illustrates an exemplary joining process configured to simultaneously provide heat and compression to join a tubular composite part and a tubular metal part relating to some embodiments of the present disclosure.

FIG. 6 illustrates an exemplary joining process 46 configured to simultaneously provide heat and compression to join the tubular composite part 42 and the tubular metal part 38 relating to some embodiments of the present disclosure. The joining process 46 is used to fuse the at least one etched surface 40 of the tubular metal part 38 and the tubular composite part 42 to form the unitary structure 36. A jaw chuck 48 may be used to hold the tubular metal part 38 and the tubular composite part 42. The jaw chuck 48 utilizes three or more separate jaws 50 spaced equidistantly. A press adapter 52 may be used on the jaw chuck 48 as a way of providing compression in a direction 53 to the tubular metal part 38 and the tubular composite part 42. At least one heating element 54 is used as a way of providing heat to the at least one etched surface 40 of the tubular metal part 38. In some embodiments, the heat is provided by generating eddy currents using the at least one heating element 54. The jaw chuck 48 holding the tubular metal part 38 may rotate around an axis 58 in a direction 56. The rotational motion allows for heat to be applied evenly around the tubular metal part 38. It should be understood that other configurations of the joining process 46 are also contemplated, for example, the three or more separate jaws 50 may be spaced differently and different numbers of jaws may be included. In some embodiments, the joining process 46 is completed in less than five minutes. Further, in some embodiments, the joining process 46 is completed in less than two minutes.

In some embodiments, the joining process 46 may be performed at a work site. In some embodiments, it is contemplated that a heating device and a compressing device may be utilized to perform the joining process 46 at a work site to quickly join parts. For example, pre-treated pipes and supports may be delivered to the work site and joined on-site using the joining process 46 to create a pipeline system. This eliminates the need for joining parts prior to being sent to a work site.

The unitary structure 36 may be disjoined by providing heat, using at least one heating element, and by providing tension. This disjoining process effectively reverses the joining process 46. In some embodiments, the tension and heat are provided simultaneously to disjoin the tubular metal part 38 and the tubular composite part 42 of the unitary structure 36. Alternatively, in some embodiments, the heat may be provided first and followed by providing tension. Further, the heat required to disjoin the unitary structure 36 may be larger than the heat provided during the joining process 46. Some embodiments are contemplated in which the devices used to provide the heat and compression to form the unitary structure 36 may be configured to also provide the heat and tension used to disjoin the unitary structure 36. After disjoining the unitary structure 36, the tubular metal part 38 and the tubular composite part 42 may be reused in other structures. For example, a disjoined tubular composite part may be reused and rejoined to form a different unitary structure with a different tubular metal part. This feature allows for the easy disassembling of structures joined using the joining process 46 while minimizing waste, increasing recycling, and reducing carbon dioxide emissions. Some embodiments are contemplated where the disjoining process may be done at a work site to disjoin structures formed using the joining process 46. For example, to dismantle a pipeline structure created using the joining process 46, a device for providing tension and a device for providing heat are utilized to disjoin the individual parts such that the individual parts may be reused in the creation of other structures.

Figure 7:
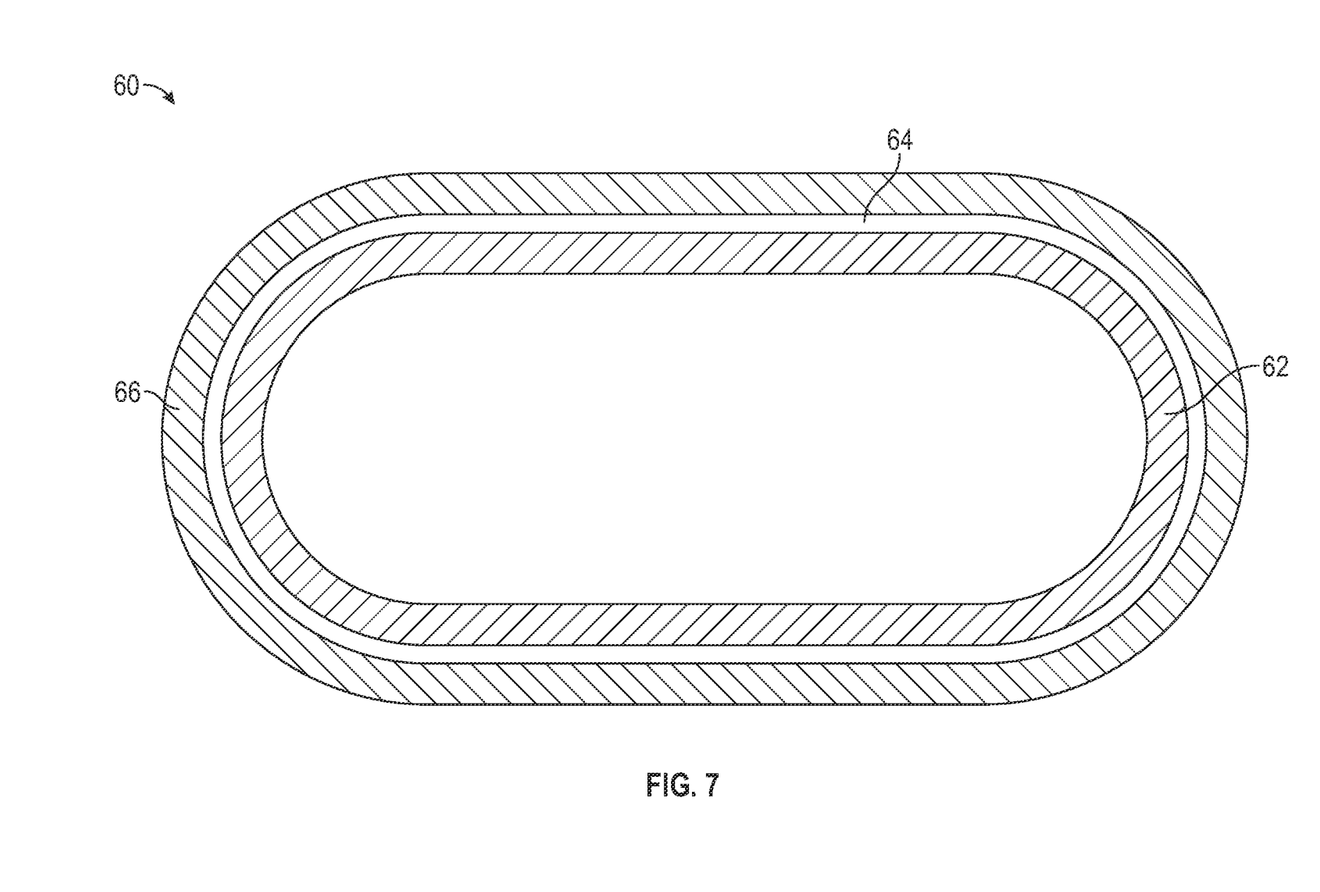
FIG. 7 illustrates a cross-section of a pressure containing structure comprising a metal portion and a composite portion relating to some embodiments of the present disclosure.

FIG. 7 illustrates a cross-section of a pressure containing structure 60 comprising a metal portion 62 and a composite portion 66 relating to some embodiments of the present disclosure. The pressure containing structure 60 comprises a metal portion 62 with at least one surface 64 of the metal portion 62 having received the laser etching treatment 10 and a composite portion 66 being joined to the at least one etched surface 64 of the metal portion 62. The composite material of the composite portion 66 may be selected based at least in part on a material property of the composite material. For example, a corrosion resistant composite material, such as a carbon fiber reinforced polymer material, may be selected to form the composite portion 66 to guard a potentially susceptible metal material of the metal portion 62 from corrosive environments.

In some embodiments, the pressure containing structure 60 comprises a pressure containing tank. In some embodiments, the pressure containing structure comprises a valve body. Further, in some embodiments, the pressure containing structure comprises a tree block. Alternatively, or additionally, in some embodiments, the pressure containing structure comprises a manifold block. In some embodiments, the pressure containing structure comprises a tube joint. In some embodiments, the metal part comprises an Inconel® material and the composite part comprises a carbon fiber PEEK material. In some embodiments, the pressure containment structure is configured to be disposed underwater in a subsea assembly. Further, the pressure containing structure 60 may be configured to contain a pressurized fluid such as any of liquid or gaseous carbon dioxide or hydrogen, as well as other forms of pressurized fluids. Accordingly, the pressure containing structure may be formed from one or more impermeable or minimally permeable materials.

In some embodiments, a process similar to the joining process 26 as described above in FIG. 3 may be performed. It is contemplated that the press 28 may be adapted to have a curved surface to form the composite portion 66 around the curved surface of the metal portion 62 that received the laser etching treatment 10. In some embodiments, the composite portion 66 is formed from a spool of composite material being wrapped around the metal portion 62 until the at least one surface 64 of the metal portion 62 having previously received the laser etching treatment 10 is at least partially covered.

Embodiments are contemplated in which the pressure containing structure 60 comprises a composite portion 66 joined to a metal liner. For example, the metal portion 62 may comprise a metal liner configured to be placed along an internal surface of the composite portion 66. Further, embodiments are contemplated in which a pressure containing pipe is formed by the metal portion 62 and the composite portion 66. For example, a cylindrical composite portion may be joined to an inner surface of a cylindrical metal portion. Accordingly, the composite portion 66 may provide an additional pressure barrier and prevent corrosion of the metal portion 62. Further still, the pressure containing structure may be used at one or more joints of a pressure containing system such as a wellhead tree system or other pressurized tubing application.

Embodiments are contemplated in which the pressure containing structure 60 is configured to handle high-pressure conditions. For example, the thickness of the metal portion 62 may be increased to better handle high-pressure conditions. In some embodiments, the pressure containing structure 60 is configured to handle low-pressure conditions. Further, in some embodiments, the pressure containing structure is configured to handle pressures lower than atmospheric pressure. In some embodiments, pressure containing piping may be connected to the pressure containing structure to form a unitary structure.

Embodiments are contemplated in which a pressure containing structure is included that comprises a composite pipe with a metal flange connected to at least one end of the composite pipe. In some such embodiments, an etching may be applied to the end of the composite pipe to facilitate connection to the metal flange. Additionally, in some embodiments, other forms of metal and composite pipe fittings are contemplated such as any of valves, reducers, couplings, and diverters. Further, some embodiments include a pressure containing structure comprising multiple composite pipes with a metal flange attached to at least one end of each composite pipe. For example, a pressurized pipeline system may be made up of composite piping where each junction of the pressurized pipeline system includes metal flanges attached to the ends of the composite pipes. Alternatively, embodiments are contemplated in which the pressure containing structure comprises a metal pipe with a composite flange connected to at least one end of the metal pipe. In some such embodiments, an etching may be applied to at least a portion of the composite flange configured to be attached to the end of the metal pipe.

Figure 8:
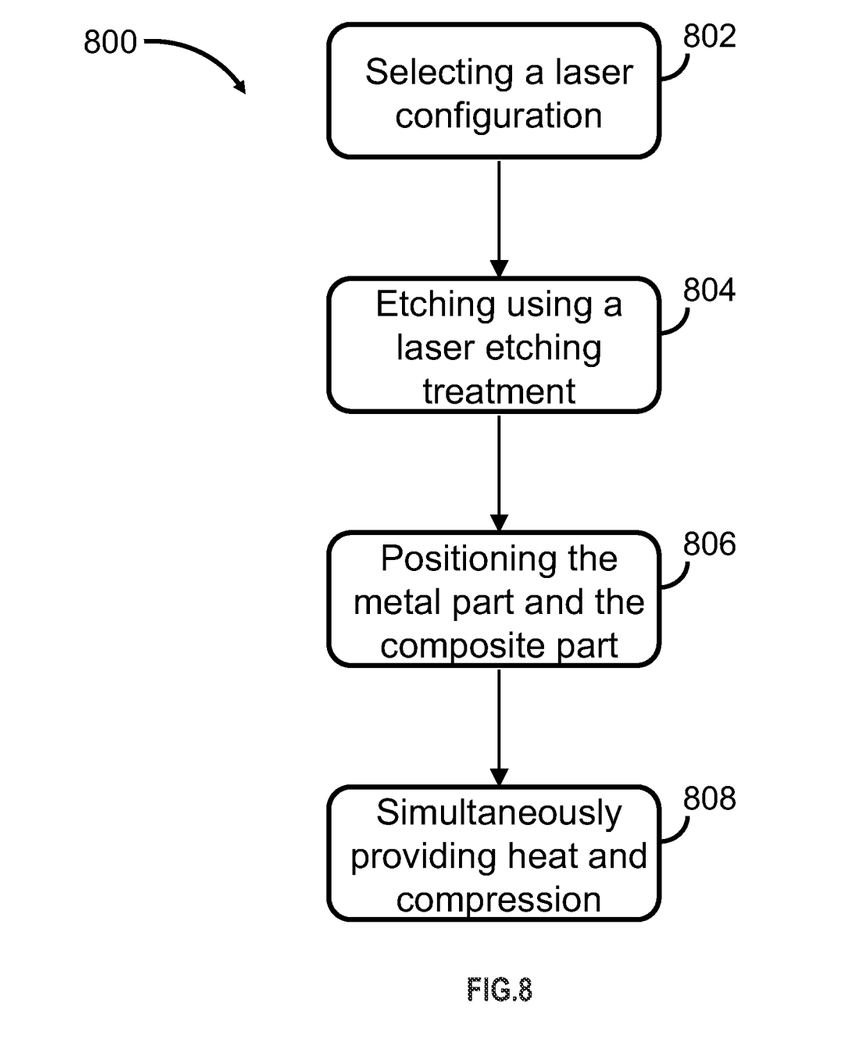
FIG. 8 depicts an exemplary method of joining a metal part and a composite part to form a unitary structure.

FIG. 8 depicts an exemplary method 800 of joining the metal part 12 and the composite part 22 to form the unitary structure 34. Said method 800 joins together the metal part 12 and the composite part 22 without the use of adhesive on the at least one etched surface 18 of the metal part 12. In some embodiments, the metal part 12 comprises a metal material such as, for example, a steel material. In some embodiments, the composite part 22 comprises a composite material such as, for example, a carbon fiber material. In some embodiments, the method 800 does not comprise applying an adhesive to the at least one etched surface 18 of the metal part 12 prior to compressing the at least one surface of the metal part 12 and the composite part 22 together.

At step 802, the laser configuration for the laser etching 16 may be selected for the laser etching treatment 10 to be applied to the at least one etched surface 18 of the metal part 12. The laser configuration may be selected based at least in part on a material property of the metal material of the metal part 12. The laser configuration may be selected based at least in part on a material property of the composite material of the composite part 22. In some embodiments, the laser configuration comprises a pattern of parallel lines, a pattern of orthogonal lines, a pattern of wavy lines, or any other pattern of laser ablation, a chosen depth of etching, and a chosen width of etching.

At step 804, the at least one surface 17 of the metal part 12 may be etched by the laser etching treatment 10 according to the laser configuration for the laser etching 16 selected in step 802. In some embodiments, the laser etching treatment 10 may be applied to at least a portion of at least one surface 17 of the metal part 12. Embodiments are also contemplated in which an entire outer surface of the metal part 38 may be etched. Further, in some embodiments, the laser etching treatment 10 may be applied to every surface of the metal part 12. In some embodiments, the laser etching device is any of a CO2 laser, a fiber laser, a UV laser, or another suitable laser ablation device.

At step 806, the composite part 22 is positioned to where the at least one etched surface 18 of the metal part 12 is in contact with the at least one surface 23 of the composite part 22. In some embodiments, multiple composite parts are positioned to contact the at least one etched surface 18 of the metal part 12. Alternatively, or additionally, in some embodiments, the composite part 22 is positioned to contact the at least one etched surface 18 of multiple metal parts.

At step 808, the metal part 12 and the composite part 22 are joined by simultaneously providing heat and compression. In some embodiments, the compression is performed by a press. In some embodiments, the heat is provided by generating eddy currents using the at least one heating element. For example, the at least one heating element may be an induction coil that uses a high frequency alternating current through an electromagnet to create rapidly alternating magnetic fields, which generate eddy currents and heat the metal part 12 to at least partially melt the composite part 22 in contact with the metal part 12. The simultaneously provided heat and compression cause the composite part 22 to at least partially melt and fill in the at least one etched surface 18 of the metal part 12 to form the joint of the parts. In some such embodiments, the provided heat causes a polymer portion of the composite part 22 to melt at least along a boundary layer between the metal part 12 and the composite part 22 and wet the at least one etched surface 18 of the metal part 12. In some embodiments, step 808 is completed in less than five minutes. Further, in some embodiments, step 808 is completed in less than two minutes.

In some embodiments, additional subsequent steps may be performed to join additional parts to the unitary structure 34. For example, an additional metal part may be added to the unitary structure 34 by repeating the steps described above. Alternatively, or additionally, an additional composite part may be added to the unitary structure 34 by repeating the steps described above.

Further, in some embodiments, an additional subsequent step may be performed after step 808 to disjoin the unitary structure 34 by providing heat and by providing tension to the unitary structure. In some embodiments, the tension and heat are provided simultaneously to disjoin the metal part 12 and the composite part 22 of the unitary structure 34. Alternatively, in some embodiments, the heat may be provided first followed by providing tension. Further, the heat required to disjoin the unitary structure 34 may be larger than the heat provided during the joining process 26. Some embodiments are also contemplated where additional subsequent steps may be performed after disjoining to reuse the metal part 12 and the composite part 22 in other structures. For example, a disjoined metal part may be reused and rejoined to form a different unitary structure with a different composite part. By performing these subsequent steps, minimizing waste, increasing recycling, and reducing carbon dioxide emissions may all be achieved. For example, recycling metal parts and composite parts via disjoining reduces carbon dioxide emissions associated with fabricating new parts.

Clause 1. A method of joining a metal part and a composite part to form a unitary structure, the method comprising: selecting a laser configuration for a laser etching treatment to be applied to at least one surface of the metal part, wherein the metal part comprises a metal material and the composite part comprises a composite material, wherein the laser configuration is selected based at least in part on a material property of the metal material; etching the at least one surface of the metal part using the laser etching treatment according to the laser configuration; positioning the metal part such that the at least one surface of the metal part contacts the composite part; providing heat, using at least one heating element, to the at least one surface of the metal part; and simultaneously while providing heat, compressing the at least one surface of the metal part and the composite part together to form the unitary structure.

Clause 2. The method of clause 1, wherein the laser configuration comprises a parallel line pattern.

Clause 3. The method of clause 1, wherein the metal material comprises steel.

Clause 4. The method of clause 1, wherein the metal material comprises aluminum.

Clause 5. The method of clause 1, wherein the metal material comprises Inconel®.

Clause 6. The method of clause 1, wherein the composite material comprises carbon fiber.

Clause 7. The method of clause 1, wherein the compressing is performed by a press configured to receive the metal part and the composite part.

Clause 8. The method of clause 7, wherein the heat is provided by generating eddy currents using the at least one heating element, and wherein the at least one heating element is coupled to the press.

Clause 9. The method of clause 1, wherein an adhesive is not applied to the at least one surface of the metal part prior to compressing the at least one surface of the metal part and the composite part together.

Clause 10. A method of joining a metal part and a composite part to form a unitary structure, the method comprising: selecting a laser configuration for a laser etching treatment to be applied to at least one surface of the metal part, wherein the metal part comprises a steel material and the composite part comprises a carbon fiber material, wherein the laser configuration is selected based at least in part on a material property of the steel material; etching the at least one surface of the metal part using the laser etching treatment according to the laser configuration; positioning the metal part such that the at least one surface of the metal part contacts the composite part; providing heat, using at least one heating element, to the at least one surface of the metal part; and simultaneously while providing heat, compressing the at least one surface of the metal part and the composite part together to form the unitary structure.

Clause 11. The method of clause 10, wherein at least one additional metal part is joined to the composite part, the method further comprising: etching at least one surface on the additional metal part.

Clause 12. The method of clause 10, wherein at least one additional composite part is joined to an additional etched surface of the metal part.

Clause 13. The method of clause 10, wherein the method further comprising: selecting a subsequent laser configuration for the laser etching treatment to be applied to at least a portion of the at least one surface of the metal part, wherein the subsequent laser configuration is selected based at least in part on a loading of the unitary structure.

Clause 14. The method of clause 10, wherein the simultaneous heating and compressing is completed in less than five minutes.

Clause 15. A pressure containment structure comprising: a metal part comprising: a metal material; and at least one surface comprising an etching pattern formed by a laser etching treatment; and a composite part comprising a composite material, wherein the composite part is joined to the at least one surface of the metal part by providing heat to the at least one surface of the metal part and, simultaneously while providing heat, compressing the at least one surface of the metal part and the composite part together.

Clause 16. The pressure containment structure of clause 15, wherein the pressure containment structure comprises a pressure containing tank.

Clause 17. The pressure containment structure of clause 15, wherein the pressure containment structure comprises a valve body.

Clause 18. The pressure containment structure of clause 15, wherein the pressure containment structure comprises a tube joint.

Clause 19. The pressure containment structure of clause 15, wherein the metal material comprises Inconel® and the composite material comprises carbon fiber polyether ether ketone.

Clause 20. The pressure containment structure of clause 19, wherein the pressure containment structure is configured to be disposed underwater in a subsea assembly.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A method of joining a metal part and a composite part to form a unitary structure, the method comprising:
   selecting a laser configuration for a laser etching treatment to be applied to at least one surface of the metal part,
   wherein the metal part comprises a metal material and the composite part comprises a composite material,
   wherein the laser configuration is selected based at least in part on a material property of the metal material;
   etching the at least one surface of the metal part using the laser etching treatment according to the laser configuration;
   etching at least one surface of the composite part using the laser etching treatment;
   positioning the metal part such that the at least one surface of the metal part contacts the at least one surface of the composite part;
   providing heat, using at least one heating element, to the at least one surface of the metal part; and
   simultaneously while providing heat, compressing the at least one surface of the metal part and the at least one surface of the composite part together to form the unitary structure.

2. The method of claim 1, further comprising:
   providing heat, using the at least one heating element, to the unitary structure; and
   simultaneously while providing heat, providing tension to the unitary structure to thereby disjoin the metal part and the composite part.

3. The method of claim 2, wherein, after the unitary structure has been disjoined, the metal part and the composite part are reused to create one or more subsequent unitary structures.

4. The method of claim 1, wherein compressing the at least one surface of the metal part and the composite part together is performed by a press configured to receive the metal part and the composite part.

5. The method of claim 4, wherein the heat is provided by generating eddy currents using the at least one heating element, and wherein the at least one heating element is coupled to the press.

6. The method of claim 1, wherein the laser configuration comprises a parallel line pattern.

7. The method of claim 1, wherein the metal material comprises aluminum.

8. The method of claim 1, wherein the metal material comprises a metal alloy.

9. The method of claim 1, wherein an adhesive is not applied to the at least one surface of the metal part prior to compressing the at least one surface of the metal part and the composite part together.

10. A method of joining a metal part and a composite part to form a unitary structure, the method comprising:
    disjoining the metal part from a first composite part by applying heat to the first composite part;
    selecting a laser configuration for a laser etching treatment to be applied to at least one surface of the metal part,
    wherein the metal part comprises a steel material and a second composite part comprises a carbon fiber material,
    wherein the laser configuration is selected based at least in part on a material property of the steel material;
    etching the at least one surface of the metal part using the laser etching treatment according to the laser configuration;
    positioning the metal part such that the at least one surface of the metal part contacts the second composite part;
    providing heat, using at least one heating element, to the at least one surface of the metal part; and
    simultaneously while providing heat, compressing the at least one surface of the metal part and the second composite part together to form the unitary structure.

11. The method of claim 10,
    wherein at least one additional metal part is joined to the second composite part,
    wherein the method further comprises:
      etching at least one surface on the at least one additional metal part.

12. The method of claim 10, wherein at least one additional composite part is joined to an additional etched surface of the metal part.

13. The method of claim 10, further comprising:
selecting a subsequent laser configuration for the laser etching treatment to be applied to at least a portion of the at least one surface of the metal part,
wherein the subsequent laser configuration is selected based at least in part on a loading of the unitary structure.

14. The method of claim 10, wherein simultaneously providing heat and compressing the at least one surface of the metal part and the second composite part together is completed in less than five minutes.

15. A method of joining a metal part and a composite part to form a pressure containment structure, the method comprising:
selecting a laser configuration for a laser etching treatment to be applied to at least one surface of the metal part,
wherein the metal part comprises a metal material and the composite part comprises a composite material;
etching the at least one surface of the metal part with a laser pattern using the laser etching treatment according to the laser configuration,
wherein the laser pattern comprises a first portion having a first depth and a second portion having a second depth,
wherein the second depth is greater than the first depth;
positioning the metal part such that the at least one surface of the metal part contacts the composite part;
providing heat, using at least one heating element, to the at least one surface of the metal part; and
simultaneously while providing heat, compressing the at least one surface of the metal part and the composite part together to form the pressure containment structure.

16. The method of claim 15, wherein the metal material comprises a metal alloy and the composite material comprises carbon fiber polyether ether ketone.

17. The method of claim 16, wherein the pressure containment structure is configured to be disposed underwater in a subsea assembly.

18. The method of claim 15, wherein the pressure containment structure comprises a pressure containing tank.

19. The method of claim 15, wherein the pressure containment structure comprises a valve body.

20. The method of claim 15, wherein the pressure containment structure comprises a tube joint.

* * * * *